United States Patent [19]

Hightower

[11] Patent Number: 5,525,361
[45] Date of Patent: Jun. 11, 1996

[54] COLOR STABLE CHEWING GUM BASES AND CHEWING GUMS MADE THEREFROM

[75] Inventor: Archie L. Hightower, Plainfield, N.J.

[73] Assignee: Wm. Wrigley Jr. Company, Chicago, Ill.

[21] Appl. No.: 405,344

[22] Filed: Mar. 16, 1995

[51] Int. Cl.⁶ ........................................ A23G 3/30
[52] U.S. Cl. ............................... 426/3; 426/662
[58] Field of Search ........................ 426/3–6, 662

[56] References Cited

U.S. PATENT DOCUMENTS

| | | | |
|---|---|---|---|
| 3,301,881 | 1/1967 | Davis | 260/403 |
| 4,479,977 | 10/1984 | Dashiell et al. | 426/609 |
| 4,493,849 | 1/1985 | Carroll et al. | 426/3 |
| 4,575,461 | 3/1986 | Friedman et al. | 426/549 |
| 4,904,482 | 2/1990 | Patel et al. | 426/3 |
| 4,943,389 | 7/1990 | Weete et al. | 426/662 |
| 5,008,037 | 4/1991 | Weete et al. | 252/314 |
| 5,041,293 | 8/1991 | Patel et al. | 426/3 |
| 5,145,708 | 9/1992 | Patel et al. | 426/3 |

*Primary Examiner*—Jeanette Hunter
*Attorney, Agent, or Firm*—Hill, Steadman & Simpson

[57] ABSTRACT

A color stable chewing gum base, and chewing gum that contains the chewing gum base, that does not include phosphatidyl ethanolamine. Preferably, the bases include a modified phosphatide. The modified phosphatide is substituted for at least the phosphatidyl ethanolamine that is present in commercially available lecithin oil. The use of modified phosphatides, and in particular, acetylated phosphatidyl ethanolamine, hinders the reaction responsible for the discoloration of the base, thus reducing or eliminating darkening of the gum base over time at elevated temperatures.

26 Claims, No Drawings

COLOR STABLE CHEWING GUM BASES AND CHEWING GUMS MADE THEREFROM

BACKGROUND OF THE INVENTION

The present invention relates generally to chewing gums and methods of making same. More specifically, the present invention relates to chewing gum bases and chewing gums made therefrom.

Chewing gum compositions typically comprise a water soluble bulk portion, a water insoluble chewable gum base portion, and flavoring agents. The water soluble portion dissipates with the flavoring agent over a period of time during chewing. The gum base portion is retained in the mouth throughout the chew.

The chewing gum base can include a number of ingredients. One ingredient that is typically used in chewing gum base is lecithin. In gum base, the lecithin acts as an emulsifier, softener, mouth texturizer, moisture retainer, stabilizer, and flavor sensory enhancer.

When used as an emulsifier, lecithin allows fats and oils to be added to the base more easily and allows same to be blended into other gum ingredients that may be present therein, such as polyvinyl acetate. This allows the resultant gum base to be more homogeneous.

As a mouth texturizer, lecithin imparts a smooth mouth feel in chewing gums made with lecithin containing bases. Flavor sensory perception is also enhanced in chewing gums made with lecithin containing bases by a pleasant feeling to the mouth and tongue.

The term lecithin, from a true chemical sense, refers to phosphatidyl choline. However, as used by suppliers of "lecithin" it refers to a brown liquid oil product or a de-oiled, powder product, derived from vegetables, e.g., corn, or beans, e.g., soy, that includes in addition to phosphatidyl choline: phosphatidyl ethanolamine; phosphatidyl inositol; phosphatidic acid; phosphatidyl serine; glycolipids; and other components. The amount of phosphatides in typically supplied lecithin oil is approximately 35% to about 65% by weight.

The use of lecithin in gum base, and in a chewing gum made from a lecithin containing base, can create discoloration problems. In this regard, in a lecithin gum base, browning is a function of temperature and time and can occur when the manufacturing and holding temperature of the gum base exceeds 180° F. for over an 8 hour period. Although, typically gum bases are manufactured within a 2 to 3 hour period at 200° to 220° F., at the chewing gum factory, gum base can be held for up to 18 hours at 200° to 230° F.

As noted above, lecithin provides many beneficial characteristics to chewing gum when used in a gum base. Attempts at replacing lecithin with other ingredients is possible, however, effects to flavor perception and mouth feel may be noticed. For example, attempting to replace lecithin with fats and oils will result in a chewing gum having reduced flavor and mouth feel.

It is therefore desirable to provide a base that includes the characteristics provided by lecithin, but, that does not discolor.

SUMMARY OF THE INVENTION

The present invention provides a color stable chewing gum base, and chewing gum that contains the chewing gum base, that does not include phosphatidyl ethanolamine and preferably, includes a modified phosphatide. The modified phosphatide is substituted for at least the phosphatidyl ethanolamine that is present in commercially available lecithin. The use of modified phosphatides, and in particular, acetylated phosphatidyl ethanolamine, hinders the reaction responsible for the discoloration of the base, thus reducing or eliminating darkening of the gum base over time at elevated temperatures.

To this end, in an embodiment, a gum base is provided including a modified phosphatide having the structure:

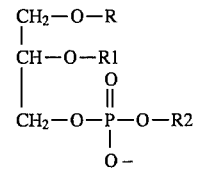

wherein
R=a fatty acid
R1=a fatty acid or an optional side-chain identical to the structures of any R2
R2=a primary side-chain the same as or different from R1 and having a structure

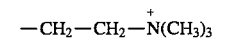

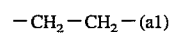

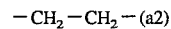

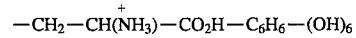

and wherein a1 and a2 are secondary, tertiary or quaternary amines of the optional and primary side chains R1 and R2, respectively, a1 and a2 can have the same or different structures, the structures being one or more of

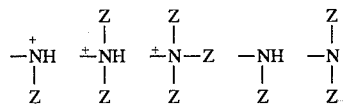

wherein each Z is one or more substituted side chains that is the same as or different from each other, the side chains being other than —$CH_3$ and

and being side chains that inhibit a carbonyl reaction of a saccharide to an amine.

In an embodiment, the R1 side-chain is a fatty acid and the a2 amine is a secondary, tertiary or quaternary amine having one or more Z-side chains.

In an embodiment, the a2 amine is a tertiary amine having one Z-side chain.

In an embodiment, the Z-side chain is an acetyl.

In an embodiment, the modified phosphatide is acetylated phosphatidyl ethanolamine.

Additionally, the present invention provides a method for preventing discoloration in a gum base formulation prone to discoloration comprising removing from the gum formula phosphatidyl ethanolamine.

In an embodiment, a modified phosphatide is added to the gum base formula.

In an embodiment, the modified phosphatide has the structure:

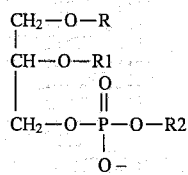

wherein

R=a fatty acid

R1=a fatty acid or an optional side-chain identical to the structures of any R2

R2=a primary side-chain the same as or different from R1 and having a structure:

$$-CH_2-CH_2-\overset{+}{N}(CH_3)_3;$$

$$-CH_2-CH_2-(a1);$$

$$-CH_2-CH_2-(a2);$$

$$-CH_2-\overset{+}{CH(NH_3)}-CO_2H-C_6H_6-(OH); \text{ and}$$

$$-H; \text{ and}$$

wherein a1 and a2 are secondary, tertiary or quaternary amines of the optional and primary side chains R1 and R2, respectively, a1 and a2 each having identical or different structures from one another, the structures being one or more of

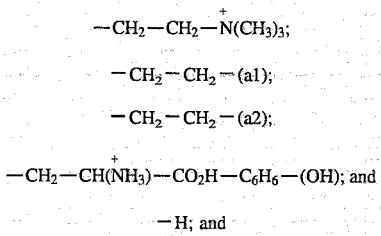

wherein each Z is one or more substituted side chains that is the same as or different from each other, the side chains being other than $-CH_3$ and

and being side chains that inhibit the carbonyl reaction of a saccharide to an amine.

In another embodiment, the present invention provides a chewing gum comprising a water insoluble gum base portion including a modified phosphatide, a water soluble portion, and flavor.

In an embodiment of the chewing gum, the modified phosphatide is acetylated phosphatidyl ethanolamine.

An advantage of the present invention is that it provides an improved chewing gum base.

A further advantage of the present invention is that it provides a chewing gum base that is color stable.

Still further, an advantage of the present invention is that it provides a chewing gum base that has reduced darkening, if any darkening, over time at elevated temperatures.

Furthermore, an advantage of the present invention is that it provides an improved chewing gum product.

Moreover, an advantage of the present invention is that it provides a chewing gum product that is color stable.

Additionally, an advantage of the present invention is that it provides the advantageous characteristics of lecithin in a color stable chewing gum base.

Further, an advantage of the present invention is that it provides an improved method for making chewing gum.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides improved gum bases, chewing gums made therefrom, and processes for making chewing gums and gum bases. Pursuant to the present invention, a color stable chewing gum base is provided. The color stable gum base reduces or eliminates darkening of the gum base over time at elevated temperatures.

In this regard, in an embodiment, the gum base includes a modified phosphatide. The modified phosphatide is provided as a substitute for phosphatidyl-ethanolamine that is present in lecithin, such as lecithin oil. It is, however, believed that a color stable base can be achieved by eliminating phosphatidyl ethanolamine from any gum base containing lecithin. Accordingly, in an embodiment of the present invention, a method of making gum base is provided comprising eliminating from a typical lecithin containing gum base formula phosphatidyl ethanolamine.

As noted previously, technically, lecithin refers to phosphatidyl choline. However, "lecithin" as that term is typically used in the industry refers to a "lecithin oil" mixture. The oil is derived from glycerides or vegetable oils. A typical composition of commercial (supplier) lecithin derived from soybean oil is:

| | |
|---|---|
| Phosphatidyl choline | 21% |
| Phosphatidyl ethanolamine | 22% |
| Phosphatidyl inositol | 19% |
| Phosphatidic Acid | 10% |
| Phosphatidyl serine | 1% |
| Glycolipids | 12% |
| Other | 15% |

The structures of phosphatides typically found in commercially available lecithin oils are:

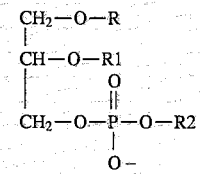

R=a fatty acid

R1=a fatty acid or an optional side-chain identical to R2

R2=a primary side-chain have the structure

| | |
|---|---|
| $-CH_2-CH_2-\overset{+}{N}(CH_3)_3$ | Phosphatidyl choline (PC) |
| $-CH_2-CH_2-(a1)$ | Phosphatidyl ethanolamine (PE) |
| $-CH_2-CH_2-(a2)$ | |
| $-CH_2-\overset{+}{CH(NH_3)}-CO_2H$ | Phosphatidyl serine (PS) |
| $-C_6H_6-(OH)_6$ | Phosphatidyl inositol (PI) |
| $-H$ | Phosphatidic acid (PA) | a1 = $-\overset{+}{NH_3}$ of the optional R1 side-chain a2 = $-\overset{+}{NH_3}$ of the primary side chain R2

It has been determined that the darkening of gum base that contains lecithin is due to a carbonyl-amine (Maillard) reaction. In this reaction, the gum base is darkened because saccharides that are present (such as reducing sugars, glucose, fructose, glycolipids, maltose, etc.) react over time at elevated temperatures with amines of the phosphatides that are also present. This results in a browning of the product.

The amines that can be present in the lecithin oil include the following structure:

 (1)

 (2)

 (3)

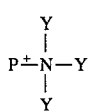 (4)

 (5)

 (6)

 (7)

wherein: P=the remaining structure of the phosphatide,

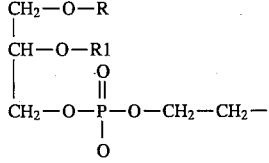

and: (1) is a primary amine; (2) is a secondary amine; (3) is a tertiary amine; (4)–(7) are quaternary amines. Y can be any atomic entity or side chain, alike or different from each other.

The type of Y-entities or side chains further describe the amine. If all the Y-entities are identical for the secondary or tertiary amines, then the amine will be a simple amine. If the Y-entities are different, then one has mixed amines. With respect to the phosphatide, the type of Y-side chain or entity also determines the type of phosphatide. For example, if the Y-entity in (4) above was —CH$_3$ and all the Y-side chains were identical, then the phosphatide would be phosphatidyl choline. If the Y-entity was —H in (4) above, then the phosphatide would be phosphatidyl ethanolamine.

Phosphatidyl ethanolamine, because of its quaternary protonated amine, is more prone to undergo a carbonylamine reaction. It has been determined that if phosphatidyl ethanolamine is eliminated from typical lecithin oil, the Maillard reaction will not occur. Additionally, if a modified phosphatide is used in the place of phosphatidyl ethanolamine, all of the desirable properties of lecithin oil can be provided without discoloration.

Pursuant to the present invention, modified phosphatides are provided wherein a side-chain or entity, most often a hydrogen atom, of the quaternary amine is replaced with one or more side groups other than —CH$_3$ or

These groups, that are identified as the Z side chains hereinafter, hinder the reducing sugar's (saccharide's) carbonyl group from reacting with the phosphatide amine group thus preventing the carbonylamine reaction.

The side groups may be linear or branched hydrocarbons such as, but not limited to, alkanes, iso-alkanes, alkenes, iso-alkenes, fatty acids, acetylated hydrocarbons such as acetate, or sulfatic and sulfitic groups such as sulfur dioxide and bisulfitic ions. These later groups are well suited for the low moisture environment of the gum base since their disassociation is high in a water environment.

The preferred side groups are sulfur dioxide, sodium or potassium bisulfate, and acetate. The most preferred side group is acetate. A preferred modified phosphatide for use in the gum base to reduce or eliminate browning via inhibition of the reducing sugar reaction with amine is acetylated phosphatidyl ethanolamine.

Although phosphatidyl ethanolamine is a phosphatide that readily reacts with sugar present in the lecithin producing darker brown discoloration, it has been discovered that when acetylated, it will prevent the reaction. The acetylated phosphatidyl ethanolamine can have the following structure:

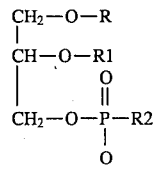

R1=fatty acid side chain

R2=—CH$_2$—CH$_2$—(a3) side chain (acetyl group) a3 is a tertiary amine and is modified version of the quaternary amine a2, the a3 structure being

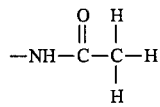

In the acetylation reaction, the quaternary a2 amine loses a hydrogen atom forming one H$_2$O, becoming tertiary.

By using the modified phosphatide, a heat stable replacement for heat unstable lecithin is provided. This allows the advantageous properties provided by the heat unstable lecithin to be provided to the gum base. At the same time, however, it will produce a chewing gum without the disadvantages property of discoloration.

The modified phosphatide, e.g., acetylated phosphatidyl ethanolamine, can be used alone as a substitute for a "lecithin" mixture (e.g., lecithin oil, de-oiled lecithin, or powdered lecithin) or with other ingredients of a typical lecithin mixture, for example: phosphatidyl choline; phosphatidyl inositol; phosphatidic acid; phosphatidyl serine; glycolipids; and other ingredients. Preferably, the modified phosphatide comprises at least approximately 0.1 percent and most preferably, at least 0.3 percent of the gum base. In a preferred embodiment, the modified phosphatide comprises approximately 0.3 to about 10 weight percent of the gum base.

The modified phosphatide can be used in a variety of chewing gum bases to make a variety of chewing gums.

In general, a chewing gum composition typically comprises a water-soluble bulk portion, a water-insoluble chewable gum base portion, and flavoring agents. The water-soluble portion dissipates with a portion of the flavoring agent over a period of time during chewing. The gum base portion is retained in the mouth throughout the chew. The term chewing gum refers to both a chewing and bubble type gum in its general sense.

The insoluble portion of the gum typically may contain any combination of elastomers, vinyl polymers, elastomer plasticizers, fillers, softeners, waxes and other optional ingredients such as colorants and antioxidants.

The variety of gum base ingredients typically used provide the ability to modify the chewing characteristics of gums made from the gum base.

Elastomers provide the rubbery, cohesive nature to the gum which varies depending on this ingredient's chemical structure and how it may be compounded with other ingredients. Elastomers suitable for use in the gum base and gum of the present invention may include natural or synthetic types.

Natural elastomers may include natural rubber such as smoked or liquid latex and guayule, natural gums such as jelutong, lechi caspi perillo, massaranduba balata, massaranduba chocolate, nispero rosidinha, chicle, gutta percha, gutta kataiu, niger gutta, tunu, chilte, chiquibul, gutta hang kang. Synthetic elastomers may include high molecular weight elastomers such as butadiene-styrene copolymers and isobutylene-isoprene copolymers, low to high molecular weight elastomers such as polybutadiene and polyisobutylene, vinyl polymeric elastomers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof.

Butadiene-styrene type elastomers, or SBR as they may be called, typically are copolymers of from about 20:80 to 60:40 styrene:butadiene monomers. The ratio of these monomers effects the elasticity of the SBR as evaluated by mooney viscosity. As the styrene:butadiene ratio decreases, the mooney viscosity decreases.

Isobutylene-isoprene type elastomers, or butyl as they may be called, have molar percent levels of isoprene ranging from 0.2 to 4.0. Similar to SBR, as the isoprene:isobutylene ratio decreases, so does the elasticity, measured by mooney viscosity.

The structure of SBR typically consists of straight chain 1,3-butadiene copolymerized with phenylethylene (styrene) and provides the non-linear molecular nature of these elastomers. The structure of butyl rubber typically consists of branched 2-methyl-1,3-butadiene (isoprene) copolymerized with branched 2-methylpropene (isobutylene), and, as with SBR, this type of structure is non-linear in nature.

Polyisobutylene, or PIB as they may be called, type elastomers are polymers of 2-methylpropene and, as with SBR and butyl, are non-linear in nature. These elastomers provide soft chew characteristics to the gum base and still provide the elastic qualities as do the other elastomers. Average molecular weights may range from about 30,000 to 120,000 and the penetration may range from about 4 millimeters to 20 millimeters. The higher the penetration, the softer the PIB.

Vinyl polymeric and copolymeric type elastomers provide tack resistance, vary the chew characteristics of gums made from these bases having vinyl polymers and offer hydrophilic properties beneficial to sensory perception of the final gums.

For copolymeric types, the amount of vinyl laurate, vinyl stearate, or ethylene present in the vinyl laurate/vinyl acetate (VL/VA), vinyl stearate/vinyl acetate (VS/VA), or ethylene/vinyl acetate (EVA) copolymers respectively typically ranges from about 10 to about 60 percent by weight of the copolymer. Average molecular weights of these polymers may range from about 2000 to about 80000.

Polyvinyl acetate having an average molecular weight from about 8000 to about 65000 are preferred for use in the gum base and chewing gum of the present invention. More preferred for gum bases are those of from about 10000 to about 35000 molecular weight and for bubble gum bases, those having from about 30000 to about 60000 molecular weight.

Polymers of vinyl acetate (PVAc), are branched in nature. The degree of branching is increased when vinyl acetate monomers are copolymerized with vinyl laurate, vinyl stearate, ethylene and the like. The higher the degree of branching, the higher the compatibility when blended or compounded with normal-alkanic and iso-alkanic type waxes.

The preferred elastomers for use in a gum base or gum of the present invention are the synthetic elastomers which include butadiene-styrene copolymers and isobutylene-isoprene copolymers, low to high molecular weight elastomers such as polybutadiene and polyisobutylene, vinyl polymeric elastomers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof.

More preferably, the synthetic elastomers used are butadiene-styrene copolymers and isobutylene-isoprene copolymers, low to high molecular weight elastomers such as polyisobutylene, polyvinyl acetate, polyethylene, or mixtures thereof. These preferred elastomers may be used in large block form or may be reduced in size by shredding or grinding prior to use in the gum base.

Other optional ingredients such as antioxidants may also be used in the gum base.

Antioxidants prolong shelf-life and storage of gum base, finished gum or their respective components including fats and flavor oils. Antioxidants suitable for use in gum base or gum of the present invention include butylated hydroxyanisole (BHA), butylated hydroxytoluene (BHT), betacarotenes, tocopherols, acidulants such as Vitamin C, propyl gallate, other synthetic and natural types or mixtures thereof.

Preferably, the antioxidants used in the gum base are butylated hydroxyanisole (BHA), butylated hydroxytoluene (BHT), tocopherols, or mixtures thereof.

Petroleum waxes aid in the curing of the FG made from the gum base as well as improve shelf-life and texture. Wax crystal size when hard also improves the release of flavor. Those waxes high in iso-alkanes have a small crystal size than those waxes high in normal-alkans, especially those with normal-alkanes of carbon numbers less than 30. The smaller crystal size allows slower release of flavor since their is more hindrance of the flavor's escape from this wax versus a wax having larger crystal sizes.

Preferably, the gum base and gum of the present invention employs petroleum waxes containing little if any normal-alkanes, or straight-chained alkanes as they may be called, and contain predominantly iso-alkanes, or branched chain alkanes, having carbon chain lengths greater than about 30. Formulation of some gum bases of this type may result in these gum bases being more homogenous and that have ingredients exhibiting more compatibility with each other. Again, this compatibility is the result of the branched nature of the other gum base ingredients.

As just mentioned, the preferred waxes are those of at least 10 mm$^2$/s viscosity, greater than 600 average molecular weight and containing predominantly iso-alkanes, or randomly branched alkans as they may be called, of carbon lengths greater than 30. Those waxes not preferred are those of less than 10 mm²/s viscosity, less than 600 average molecular weight, containing predominantly normal-alkanes of carbon lengths less than and greater than 30 and some terminally branched iso-alkanes. Synthetic waxes are produced by means atypical of petroleum wax production and thus are not considered petroleum wax. These synthetic waxes may be used in accordance with the present invention and may be included optionally in the gum base and gum.

The synthetic waxes may include waxes containing branched alkanes and copolymerized with monomers such as but not limited to propylene and polyethylene and Fischer Tropsch type waxes. Polyethylene wax is not in the same category as polyethylene, a polymer of ethylene monomers. Rather, polyethylene wax is a synthetic wax containing alkane units of varying lengths having attached thereto ethylene monomers.

The base may also be wax free. Wax free chewing gums are disclosed in, for example, U.S. Pat. No. 5,286,500, the disclosure of which is incorporated herein by reference.

Elastomer plasticizers vary the firmness of the gum base. Their specificity on elastomer inter-molecular chain breaking (plasticizing) along with their varying softening points cause varying degrees of finished gum firmness and compatibility when used in base. This may be important when one wants to provide more elastomeric chain exposure to the alkanic chains of the waxes.

Elastomer plasticizers suitable for use in the present invention include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, hydrogenated methyl esters of rosin, pentaerythritol ester of rosin, synthetic elastomer plasticizers such as terpene resins derived from alpha-pinene, beta-pinene and/or d-limonene and mixtures thereof.

The elastomer plasticizers used may be of one type or of combinations of more than one type. Typically, the ratios of one to the other are dependent on each respective softening point, the effect on flavor release, and the respective degree of tack they case to the gum. Ball and ring softening points of the rosin ester types described above may range from about 45° C. to about 120° C. Softening points of the terpene resins may range from about 60° C. to about 130° C.

Occasionally, both terpene and rosin ester resins may be used in the present invention. The terpene:rosin ester ratios may range from about 1:15 to about 15:1.

Softeners modify the texture, cause the hydrophobic and hydrophilic components of the base to be miscible, and may further plasticize the synthetic elastomers of the gum base. Softeners suitable for use in the gum base and gum of the present invention include triglycerides of non-hydrogenated, partially hydrogenated and fully hydrogenated cottonseed, soybean, palm, palm kernel, coconut, safflower, tallow, cocoa butter, medium chained triglycerides and the like.

The preferred softeners include unsaturated, partially unsaturated, or fully saturated oils that contain, as one or more of their constituent groups, fatty acids of carbon chain length of from 6 to 18, determined from the fatty acid methyl ester distribution of gas chromatography.

The selection of softeners has an influence on the softness of the base. The caproic, caprylic, capric, myristic, lauric and palmitic fatty acids of the triglycerides tend to plasticize the synthetic elastomers more than triglycerides containing predominantly stearic fatty acid. As examples, triglycerides high in saturated lauric fatty acid more effectively plasticize the vinyl laurate/vinyl acetate copolymer, and those high in saturated palmitic fatty acid more effectively plasticize the polyvinyl acetate polymer, increasing the branching.

Monoglycerides, diglycerides, acetylated monoglycerides, distilled mono- and diglycerides and lecithin may, from their manufacturing processing, contain triglyceride levels less than 2 percent by weight. Though these ingredients are softeners, they would not be considered as being the same family as the above mentioned softeners oils and would be in a family of their own.

Fillers used in gum base modify the texture of the gum base and aid in processing. Fillers suitable for use in the gum base and gum of the present invention include carbonate, ground limestone and silicate types such as magnesium and aluminum silicate, clay, alumina, talc, as well as titanium oxide, mono-, di- and tricalcium phosphate, cellulose polymers such as ethyl, methyl and wood or mixtures thereof.

Particle size has an effect on cohesiveness, density and processing characteristics of the gum base and its compounding. The smaller the particle size, the more dense and cohesive the final gum base. Also, by selecting fillers based on their particle size distribution, initial mass compounding may be varied, thus allowing alteration of the compounding characteristics of the initial mass during gum base processing and ultimately the final chew characteristics of gums made from these gum bases.

Talc filler may be used in the gum base and gum of the present invention that may come in contact with or employ acid flavors or provide an acidic environment needed to prevent degradation of an artificial sweetener by reacting with calcium carbonate type fillers. Mean particle size for calcium carbonate and talc fillers typically range from about 0.1 micron to about 15 microns.

Preferably, the fillers used in the gum base and gum of the present invention are calcium carbonate, ground limestone, talc, mono-, di- and tricalcium phosphate, zirconium silicate, or mixtures thereof.

More preferably, the fillers used have a mean particle size range from about 0.4 to about 14 microns and are calcium carbonate and talc.

The starting mass preferably may comprise one or more of filler, elastomer, elastomer plasticizer, vinyl polymer or copolymer. Preferably, the starting mass is comprised of some or all of the natural or synthetic elastomer, some or all of the filler and some or all of the elastomer plasticizer.

The levels of gum base ingredients present in the starting mass may range from about 0 percent to about 40 percent elastomer plasticizer, 0–15 percent vinyl polymer, 0 to 40 percent and from about 10 percent to about 40 percent elastomer, all by weight of the gum base ingredient.

Flavorants and colorants impart characteristics or remove or mask undesired characteristics. Colorants may typically include FD&C type lakes, plant extracts, fruit and vegetable extracts and titanium dioxide flavorants may typically include cocoa powder, heat-modified amino acids and other vegetable extracts.

Preferably, the colorant and flavorant are FD&C type lakes and cocoa powder respectively and are present at levels from about 0 percent to about 15 percent by weight.

Gum bases are typically prepared by adding an amount of the elastomer, elastomer plasticizer and filler, and on occasion a vinyl polymer, to a heated (50°–240° F.) sigma blade mixer with a front to rear speed ratio of from about 1.2:1 to about 2:1, the higher ratio typically being used for chewing gum base which requires more rigorous compounding of its elastomers.

The initial amounts of ingredients comprising the initial mass may be determined by the working capacity of the mixing kettle in order to attain a proper consistency and by the degree of compounding desired to break down the elastomer and increase chain branching. The higher the level of filler at the start or selection of a filler having a certain particle size distribution, the higher the degree of compounding and thus more of the elastomeric chain crosslinking are broken, causing more branching of the elastomer thus lower viscosity bases and thus softer final gum base and gum made from such a base. The longer the time of compounding, the use of lower molecular weight or softening point gum base ingredients, the lower the viscosity and firmness of the final gum base.

Compounding typically begins to be effective once the ingredients have massed together. Anywhere from 15 minutes to 90 minutes may be the length of compounding time.

Preferably, the time of compounding is from 20 minutes to about 60 minutes. The amount of added elastomer plasticizer depends on the level of elastomer and filler present. If too much elastomer plasticizer is added, the initial mass becomes over plasticized and not homogeneous.

After the initial ingredients have massed homogeneously and compounded for the time desired, the balance of the base ingredients are added in a sequential manner until a completely homogeneous molten mass is attained. Typically, any remainder of elastomer, elastomer plasticizer, vinyl polymer and filler, are added within 60 minutes after the initial compounding time. The filler and the elastomer plasticizer would typically be individually weighed and added in portions during this time. The optional waxes and the oils are typically added after the elastomer and elastomer plasticizers and during the next 60 minutes. Then the mass is allowed to become homogeneous before dumping.

Typical base processing times may vary from about one to about three hours, preferably from about 1½ to 2½ hours, depending on the formulation. The final mass temperature when dumped may be between 70° C. and 130° C. and preferably between 100° C. and 120° C. The completed molten mass is emptied from the mixing kettle into coated or lined pans, extruded or cast into any desirable shape and allowed to cool and solidify. Those skilled in the art will recognize that many variations of the above described procedure may be followed.

Examples of gum bases made in accordance with the present invention are shown in Tables 1 and 2 below. These are presented to exemplify embodiments of the present invention and in no way are presented to limit the scope of the present invention.

Gum formulas may comprise from about 10 to about 95 percent by weight of a gum base made in accordance with the present invention in a gum formula typically known to those in the art.

The water-soluble portion of the chewing gum may comprise softeners, sweeteners, flavoring agents and combinations thereof. The sweeteners often fill the role of bulking agents in the gum. The bulking agents generally comprise from about 5 percent to about 90 percent, preferably from about 20 percent to about 80 percent of the chewing gum.

Softeners are added to the chewing gum in order to optimize the chewability and mouth feel of the gum. Softeners typically constitute from about 0.5 percent to about 25.0 percent by weight of the chewing gum. Softeners contemplated for use in the gum include glycerin, modified lecithin and combinations thereof. Further aqueous sweetener solutions such as those containing sorbitol, hydrogenated starch hydrolysates, corn syrup and combinations thereof may be used as softeners and bulking agents in gum. Sugar-free formulations are also typical.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The sweetener for use in the present invention can also be used in combination with sugarless sweeteners. Generally, sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol an the like, alone or in any combination.

Depending on the particular sweetness release profile and shelf-life stability needed, bulk sweeteners of the present invention can also be used in combination with coated or uncoated high-intensity sweeteners or with high-intensity sweeteners coated with other materials and by other techniques.

High-intensity sweeteners, or artificial sweeteners and peptide sweeteners as they may be referred to, typically may include, but are not limited to, alitame, thaumatin, aspartame, sucralose, acesulfame, saccharin and dihydrochalcones. The range of these sweetener types in gum typically may range from about 0.02 to 0.10 weight percent for sweeteners such as alitame, thaumatin and dihydrochalcones, and from about 0.1 to about 0.3 weight percent for sweeteners like aspartame, sucralose, acesulfame and saccharin.

A flavoring agent may be present in the chewing gum in an amount within the range of from about 0.5 to about 3.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

Examples of gum formulas made in accordance with the present invention are shown in Table 3. These are presented to exemplify embodiments of the present invention and in no way are presented to limit the scope of the present invention.

By way of example, and not limitation, examples of the present invention will now be given:

EXAMPLES OF MODIFIED PHOSPHATIDE USE IN GUM BASE

TABLE NO. 1

| Base Type | BB | BB | BB | BB | BB |
|---|---|---|---|---|---|
| Ingredient |  |  |  |  |  |
| Wax |  |  |  |  |  |
| Micro MP >70° C. | — | — | 12 | 20 | — |
| Elastomer Present |  |  |  |  |  |
| SBR | 9 | 8 | 8 | 7 |  |
| Butyl |  |  |  |  | 2 |
| Natural |  |  |  |  |  |
| PIB |  |  |  |  | 9 |
| Elastomer Plast |  |  |  |  |  |
| Rosin Esters | 36 | 49 | 42 | 24 |  |
| Terpene Resin |  |  |  |  | 13 |
| Filler | 46 | 37 | 34 | 40 | 15 |
| Vinyl Polymers |  |  |  |  |  |
| Mol Wgt <15000 |  |  |  |  |  |
| 15000 < x < 50000 |  |  |  |  | 10 |
| Mol Wgt >50000 |  |  |  |  | 16 |
| Glycerol M.S. | 1 | 3 | 4 | 1 | 8 |
| Hyd. Veg. Oil |  |  |  |  |  |
| MP >55° C. |  |  |  |  |  |
| MP <55° C. | 1 |  | 1 |  |  |
| Modified Phosphatide | 7 | 3 | 1 | 4 | 2 |
| Acetylated Glyc. |  |  |  |  | 5 |
| Triacetin |  |  |  | 3 |  |

TABLE NO. 2

| Base Type | CB | CB | CB | CB | CB | CB | CB |
|---|---|---|---|---|---|---|---|
| Ingredient |  |  |  |  |  |  |  |
| Wax |  |  |  |  |  |  |  |
| Micro MP >70° C. | — | — | — | — | 16 | 19 | 30 |
| Elastomer Present |  |  |  |  |  |  |  |
| SBR |  |  |  |  |  |  |  |
| Butyl | 8 | 5 | 9 | 6 | 7 | 9 | 7 |
| Natural | 25 | 28 |  | 25 |  | 3 |  |
| PIB | 4 | 3 |  | 1 |  | 6 |  |
| Elastomer Plast |  |  |  |  |  |  |  |
| Rosin Esters | 14 | 16 | 30 | 21 | 22 | 19 | 11 |
| Terpene Resin |  |  |  |  | 3 |  |  |
| Filler | 14 | 9 | 42 | 6 | 24 | 22 | 20 |
| Vinyl Polymers |  |  |  |  |  |  |  |
| Mol Wgt <15000 | 19 | 27 |  | 38 | 1 | 13 | 8 |
| 15000 < x < 50000 |  |  |  |  |  |  |  |
| Mol Wgt >50000 |  |  |  |  |  |  |  |
| Polyethylene |  |  |  |  | 2 |  |  |
| Glycerol M.S. | 2 |  | 8 |  | 3 | 4 | 6 |
| Hyd. Veg. Oil |  |  |  |  |  |  |  |
| MP >55° C. | 8 | 6 | 4 |  | 5 | 6 |  |
| MP <55° C. |  |  |  |  |  |  |  |
| Modified Phosphatide | 6 | 5 | 7 | 3 | 2 | 1 | 4 |

EXAMPLES OF CHEWING GUM INCLUDING MODIFIED PHOSPHATIDES

TABLE NO. 3

|  | Sugar Gum | Sugarless Gum |
|---|---|---|
| Water Insoluble Ingredients |  |  |
| Gum Base | 10–50 | 23–55 |
| Flavor Oil | 0.2–2.5 | 0.2–3.5 |
| Water Soluble Ingredients |  |  |
| Natural Sweetener | 35–65 | — |
| Polyol Sweeteners | — | 30–65 |
| Corn Syrup | 5–35 | — |
| Glycerine | 0.1–3.5 | 3–25 |
| Optional Ingredients |  |  |
| Softeners | 0–2 | 0–2 |
| Water | 0–0.3 | — |
| Artificial Sweeteners | 0–0.6 | 0–0.6 |
| Fruit Acids | 0–0.6 | 0–0.6 |

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A gum base comprising approximately 0.1 to about 10 percent by weight of a modified phosphatide having the structure:

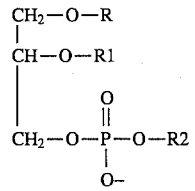

wherein

R=a fatty acid

R1=a fatty acid or an optional side-chain identical to the structures of any R2

R2=a primary side-chain the same as or different from R1 and having a structure:

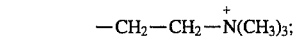

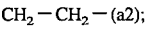

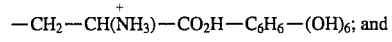

wherein a1 and a2 are secondary, tertiary or quaternary amines of the optional and primary side chains R1 and R2, respectively, a 1 and a2 each having identical or different structures from one another, the structures being one or more of

wherein each Z is one or more substituted side chains that is the same as or different from each other, the side chains being other than —CH$_3$ and

and being side chains that inhibit a carbonyl reaction of a saccharide to an amine.

2. The gum base of claim 1 wherein the R1 sidechain is a fatty acid and the a2 amine is a secondary, tertiary or quaternary amine having one or more Z-side chains.

3. The gum base of claim 1 wherein the a2 amine is a tertiary amine having one Z-side chain.

4. The gum base of claim 1 wherein the Z-side chain is an acetyl.

5. The gum base of claim 1 wherein the modified phosphatide is acetylated phosphatidyl ethanolamine.

6. The gum base of claim 1 wherein the base includes at least one ingredient chosen from the group consisting of: phosphatidyl choline; phosphatidyl inositol; phosphatidic acid; and phosphatidyl serine.

7. The gum base of claim 1 wherein the base contains petroleum wax comprising predominantly isoalkanes having carbon chain lengths greater than about 30.

8. The gum base of claim 1 wherein the base is wax-free.

9. A method of modifying a gum base formula that includes lecithin and that creates gum base that is prone to discoloration comprising removing from the gum formula phosphatidyl ethanolamine.

10. The gum base of claim 9 wherein the lecithin is obtained from soybean oil.

11. The gum base of claim 9 wherein the lecithin is de-oiled.

12. The method of claim 9 wherein a modified phosphatide is added to the gum base formula.

13. The method of claim 12 wherein the modified phosphatide has the structure:

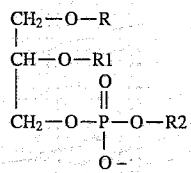

wherein

R=a fatty acid

R1=a fatty acid or an optional side-chain identical to the structures of any R2

R2=a primary side-chain the same as or different from R1 and having a structure:

—CH$_2$—CH$_2$—N$^+$(CH$_3$)$_3$;

—CH$_2$—CH$_2$—(a1);

—CH$_2$—CH$_2$—(a2);

-continued

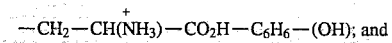

—H; and wherein a1 and a2 are secondary, tertiary or quaternary amines of the optional and primary side chains R1 and R2, respectively, a1 and a2 each having identical or different structures from one another, the structures being one or more of

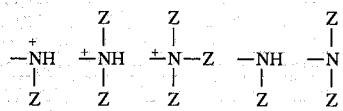

wherein each Z is one or more substituted side chains that is the same as or different from each other, the side chains being other than —CH$_3$ and

and being side chains that inhibit a carbonyl reaction of a saccharide to an amine.

14. The method of claim 12 wherein the modified phosphatide is present in an amount of approximately 0.3 to about 10 percent by weight of the gum base.

15. The method of claim 13 wherein the R1 side-chain is a fatty acid and the a2 amine is a secondary, tertiary or quaternary amine having one or more Z-side chains.

16. The method of claim 13 wherein the a2 amine is a tertiary amine having one Z-side chain.

17. The method of claim 13 wherein the Z-side chain is an acetyl.

18. The method of claim 9 wherein the formula includes phosphatidylcholine.

19. The method of claim 9 wherein the lecithin is powdered lecithin.

20. A chewing gum comprising:

a water insoluble gum base portion including a modified phosphatide;

a water soluble portion; and a flavor.

21. The chewing gum of claim 20 wherein the modified phosphatide has the structure:

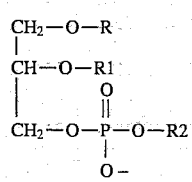

wherein

R=a fatty acid

R1= a fatty acid or an optional side-chain identical to the structures of any R2

R2=a primary side-chain the same as or different from R1 and having a structure:

—CH$_2$—CH$_2$—N$^+$(CH$_3$)$_3$;

—CH$_2$—CH$_2$—(a1);

-continued
—CH₂—CH₂—(a2);

—CH₂—CH(NH₃⁺)—CO₂H—C₆H₆—(OH); and

—H; and wherein a1 and a2 are secondary, tertiary or quaternary amines of the optional and primary side chains R1 and R2, respectively, a1 and a2 each having identical or different structures from one another, the structures being one or more of

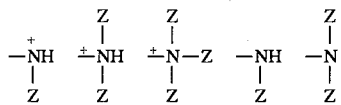

wherein each Z is one or more substituted side chains that is the same as or different from each other, the side chains being other than —CH₃ and

and being side chains that inhibit a carbonyl reaction of a saccharide to an amine.

22. The chewing gum of claim 20 wherein the modified phosphatide is blended in an oil obtained from soybeans.

23. The chewing gum of claim 20 wherein the modified phosphatide is de-oiled.

24. The chewing gum of claim 20 wherein the modified phosphatide is acetylated phosphatidyl ethanolamine.

25. A gum base that is not as prone to discoloration at elevated temperatures over time as a lecithin containing gum base, the gum base including a modified phosphatide.

26. The gum base of claim 25 wherein the modified phosphatide is acetylated phosphatidyl ethanolamine.

* * * * *